United States Patent
Lang et al.

(10) Patent No.: US 11,976,087 B2
(45) Date of Patent: May 7, 2024

(54) LIGHT-STIMULI RESPONSIVE COORDINATION POLYMER, AND PREPARATION AND USE THEREOF

(71) Applicant: SOOCHOW UNIVERSITY, Suzhou (CN)

(72) Inventors: Jianping Lang, Suzhou (CN); Zhanyong Yang, Suzhou (CN); Chunyan Ni, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/026,820

(22) PCT Filed: Feb. 15, 2022

(86) PCT No.: PCT/CN2022/076363
§ 371 (c)(1),
(2) Date: Mar. 16, 2023

(87) PCT Pub. No.: WO2023/123626
PCT Pub. Date: Jul. 6, 2023

(65) Prior Publication Data
US 2024/0051973 A1     Feb. 15, 2024

(30) Foreign Application Priority Data
Dec. 30, 2021 (CN) .......................... 202111638710.3

(51) Int. Cl.
*C07F 3/06* (2006.01)
*C08J 5/18* (2006.01)
(Continued)

(52) U.S. Cl.
CPC .................... *C07F 3/06* (2013.01);
*C08J 5/18* (2013.01); *C08K 5/0091* (2013.01);
*F03G 7/016* (2021.08); *F03G 7/029* (2021.08); *C08J 2329/04* (2013.01)

(58) Field of Classification Search
None
See application file for complete search history.

(56) References Cited

U.S. PATENT DOCUMENTS

| 2010/0174047 A1 | 7/2010 | Jung et al. |
| 2014/0088312 A1 | 3/2014 | Li et al. |

FOREIGN PATENT DOCUMENTS

| CN | 109096507 A | 12/2018 |
| CN | 109232431 A | 1/2019 |
| CN | 113999402 A | 2/2022 |

OTHER PUBLICATIONS

Dai, et al., "Zinc(II) coordination polymers of tetrakis(4-pyridyl)cyclobutane and various dicarboxylates: Synthesis, structures and luminescent properties," CrystEngComm, 2012, 14, 6230-6240. (Year: 2012).*

(Continued)

*Primary Examiner* — Fred M Teskin
(74) *Attorney, Agent, or Firm* — SZDC Law PC (57) ABSTRACT

The invention provides a light-stimuli responsive coordination polymer, and preparation method and use thereof. The coordination polymer has a chemical formula of $[Zn(tkpvb)(Fb)_2]_{n1}$, wherein Fb represents p-fluorobenzoate, tkpvb represents 1,2,4,5-tetrakis((E)-2-(4-pyridyl)vinyl)benzene, and $n=3000-60000$; and crystallographic parameters of: (1) crystal system: monoclinic system; (2) space group: C2/c; (3) $a=28.577(3)$ Å, $b=7.4084(6)$ Å, $c=22.612(3)$ Å, $\beta=126.771(2)°$, and $V=3834.8(7)$ Å$^3$; (4) $Z=4$; and (5) $F(000)=1720$, $R_1=0.0440$, $wR_2=0.1042$, and $GOF=1.047$. The method is simple, and has mild reaction conditions, and (Continued)

fast light conversion rate. The means of light-stimuli responsiveness are non-contact and non-damage type, the volume adjustment is highly accurate, and the whole adjustment process does not require any chemical reagents, and is safe and reliable. Photoactuators can complete a variety of behaviors under the irradiation of ultraviolet light having a wavelength of 365 nm.

8 Claims, 7 Drawing Sheets

(51) Int. Cl.
  *C08K 5/00* (2006.01)
  *F03G 7/00* (2006.01)

(56) References Cited

OTHER PUBLICATIONS

Gong Wei-Jie et al., "Luminescent cadmium(II) coordination polymers of 1,2,4,5-tetrakis(4-pyridylvinyl)benzene used as efficient multi-responsive sensors for toxic metal ions in water" Dalton Transactions, vol. 46, Nr.:48, pp. 16861-16871 (Dec. 31, 2017).

* cited by examiner

LIGHT-STIMULI RESPONSIVE COORDINATION POLYMER, AND PREPARATION AND USE THEREOF

This application is the National Stage Application of PCT/CN2022/076363, filed on Feb. 15, 2022, which claims priority to Chinese Patent Application No. 202111638710.3, filed on Dec. 30, 2021, which is incorporated by reference for all purposes as if fully set forth herein.

FIELD OF THE INVENTION

The present invention relates to the technical field of light-stimuli responsive materials, and specifically to a light-stimuli responsive coordination polymer, and preparation method and use thereof.

DESCRIPTION OF THE RELATED ART

Stimuli-responsive materials are a class of smart materials where their physical/chemical properties are reconfigured with changes in the external environment. They have attracted the attention of researchers due to the great potential applications in intelligent robots, biomedical science, biomimicry and molecular machines. At present, various types of environmental stimuli-responsive materials have been reported. By means of rational design, these materials can respond to a variety of external physical/chemical stimuli, such as heat, electric field, magnetic field, humidity, and light etc.

As a branch of stimuli-responsive materials, light-responsive materials, due to their non-damage and non-contact external means of triggering, have unique attractiveness in energy conversion. These ideal intrinsic properties also endow them with great advantages in practical applications, such as in photoactuator. In recent years, light-driven materials have achieved rapid development, mainly in the external deformations of the materials caused by photochemical reactions or photothermal effects, including bending, coiling, shrink/stretch, swimming, and other behaviors (see: Guo J, Fan J, Liu X, Zhao Z, Tang B, Angew. Chem. Int. Ed, 2020, 59, 8828-8832). These light-responsive molecules mainly include diarylethene, anthracene, schiff bases and azobenzene derivatives, which undergo reversible deformation under light/thermal stimulation. Therefore, the strategy for designing and synthesizing most of the photoactuators are to insert light-responsive molecular moieties into the networks, gels and molecular crystals of liquid crystal polymers, where the light-responsive molecular moieties act as an optical switch unit to achieve fast and reversible light-driven deformation behaviors (see: Wang H, Chen P, Wu Z, Zhao J, Sun J, Lu R, Angew. Chem. Int. Ed, 2017, 56, 9463-9467). However, due to the anisotropic optical-mechanical behavior and crystallinity of the photoactuator, the free volume is closely related to the molecular orientation. Therefore, the "bottom-up" design and synthesis of a class of materials having a hierarchical structure and capable of optical-mechanical energy conversion encounter great challenges.

It is well known that coordination polymers (CPs) are a new class of crystalline materials formed by the self-assembly of inorganic metal ions/metal clusters and organic bridging ligands through coordination bonds. The adjustability and periodicity of the CP structure provide a good solution to the "bottom-up" design and synthesis of CP-based light-driven materials. Namely, a light-responsive molecular moiety can be inserted into a highly ordered and specially arranged CP backbone, such that the photosensitive molecule undergoes a chemical reaction under light irradiation, to generate photoinduced stress, and thus drive the mechanical deformation of the material (see: Shi Y X, Zhang W H, Abrahams B F, Braunstein P, Lang J P, Angew. Chem. Int. Ed, 2019, 58, 9453-9458). Moreover, the photoinduced stress generated by the chemical reaction of the photosensitive molecule in the CP backbone is generally at the molecular level, and cannot cause the CP material to deform significantly macroscopically. It is also a very challenging task to choose an appropriate method to amplify this photoinduced stress to the macroscopic optical-mechanical behavior.

Therefore, the design and synthesis of a new, high-sensitivity solid-state light-stimuli responsive material is of great significance in photo-actuated electronic micro-devices and biomimetic materials.

SUMMARY OF THE INVENTION

To solve the above problems, a light-stimuli responsive coordination polymer, and preparation and use thereof are provided. The preparation method of the coordination polymer is simple, and has mild reaction conditions, and fast light conversion rate. The photoactuators prepared therewith can accomplish various behaviors quickly.

According to the technical solution of the present invention, the light-stimuli responsive coordination polymer is a bright yellow bulk crystal and has a chemical formula of $[Zn(tkpvb)(Fb)_2]_{n1}$, crystallographic parameters of:

(1) crystal system: monoclinic system;
(2) space group: C2/c;
(3) a=28.577(3) Å, b 7.4084(6) Å, c=22.612(3) Å, β=126.771(2)°, and V=3834.8(7) Å³;
(4) Z=4; and
(5) F(000)=1720, $R_1$=0.0440, $wR_2$=0.1042, and GOF=1.047, wherein Fb represents p-fluorobenzoate, tkpvb represents 1,2,4,5-tetrakis((E)-2-(4-pyridyl)vinyl)benzene, and n1=3000-60000. The chemical structures of fluorobenzoate and 1,2,4,5-tetrakis((E)-2-(4-pyridyl)vinyl)benzene are respectively as shown by Formulas (I) and (II):

Specifically, the crystallographic parameters of the light-stimuli responsive coordination polymer further include $D_c=1.445/g\cdot cm^{-3}$, $\mu=0.704$ (Mo-K$\alpha$)/mm$^{-1}$, total number of diffraction point of 19493, and number of independent diffraction points of 4392.

In a second aspect, the present invention provides a method for preparing the light-stimuli responsive coordination polymer. The method includes the following steps:

dissolving zinc nitrate hexahydrate, p-fluorobenzoic acid or a water-soluble salt thereof, and 1,2,4,5-tetrakis((E)-2-(4-pyridyl)vinyl)benzene in a mixed solvent of N,N'-dimethylformamide and water, adjusting the pH to 5-6, and reacting to obtain the light-stimuli responsive coordination polymer.

Preferably, the molar ratio of zinc nitrate hexahydrate, p-fluorobenzoic acid or a water-soluble salt thereof and 1,2,4,5-tetrakis((E)-2-(4-pyridyl)vinyl)benzene is 1-2.5:1-2.5:1-2.5, and preferably 1:1:1.

Preferably, the reaction temperature is 120 to 125° C., and the time is 5-12 h. More preferably, the reaction temperature is 120° C., and the reaction time is 6 h.

Preferably, the volume ratio of N,N'-dimethylformamide and water in the mixed solvent is 1:1-4, and more preferably, 2:3.

Preferably, the pH is adjusted to 5-6 with hydrochloric acid having a concentration of 0.1 M. More preferably, the pH is adjusted to 5.

The light-stimuli responsive coordination polymer (CP1) of the present invention undergoes a chemical reaction under the irradiation of a light source having a wavelength of 365 nm, where the aromatic ring inside the crystal rotates, and a new and different coordination polymer [Zn (poly-bpbpvpcb) (Fb)$_2$]$_{n2}$(CP2) is obtained by the single crystal-single crystal method, in which poly-bpbpvpcb represents poly-1,3-bis(4-pyridyl)-(2,5-bis(2-(4-pyridyl)-vinyl)phenyl)cyclobutane, and n3=3000-60000.

In a third aspect, the present invention provides a composite film. the composite film includes a light-stimuli responsive coordination polymer according to claim 1.

Preferably, the composite film has a thickness of 70-90 m.

A method for preparing the composite film includes the following steps:

S1: grinding a light-stimuli responsive coordination polymer, dispersing in a solvent, and drying;

S2: adding a substrate, and stirring to obtain a uniform viscous liquid;

S3: adding the uniform viscous liquid into a mold, drying, and peeling to obtain the composite film.

Preferably, the solvent is selected from the group consisting of ethanol, acetonitrile, diethyl ether, water and any combination thereof, and more preferably ethanol.

Preferably, in Steps S1 and S3, the drying temperature is 60-80° C.

Preferably, the substrate is selected from the group consisting of polyvinyl alcohol (PVA), chitosan, polyvinylidene difluoride, polypropylene and any combination thereof.

Preferably, the substrate is a 10 wt % PVA aqueous solution, and the weight ratio of the light-stimuli responsive coordination polymer to the PVA aqueous solution is 0.1-0.9:11. In Step S3, the drying is performed to remove water in the PVA aqueous solution.

Preferably, in Step S3, the drying is performed at 60-80° C. to remove the solvent.

In a fourth aspect, the present invention provides a photoactuator. The photoactuator is prepared with a composite film according to claim 5.

Specifically, the composite film is prepared into the photoactuator by cutting, folding, and fixing and connecting of multiple composite films, where the photoactuator is two-dimensional or three-dimensional.

In a fifth aspect, the present invention provides use of the light-stimuli responsive coordination polymer or the composite film in photoactuation.

Preferably, the photoactuation is enabled by irradiation with light of 365 nm.

Compared with the prior art, the technical solution of the present invention has the following advantages:

1. A new coordination polymer is prepared in the present invention, which undergoes an [2+2] cycloaddition reaction under irradiation with light having a wavelength of 365 nm, to afford an isomeric compound. The preparation method of the coordination polymer is simple, and has mild reaction conditions, and fast light conversion rate.

2. The means of light-stimuli responsiveness in the present invention are non-contact type and non-damage type, the volume adjustment is highly accurate, and the whole adjustment process does not require any chemical reagents, and is safe and reliable.

3. Depending on specific shapes, the photoactuator prepared with the light-stimuli responsive coordination polymer of the present invention can complete a variety of behaviors under the irradiation of ultraviolet light having a wavelength of 365 nm.

DETAILED DESCRIPTION OF THE PREFERRED EMBODIMENTS

The present invention will be further described below with reference to the accompanying drawings and specific examples, so that those skilled in the art can better understand and implement the present invention; however, the present invention is not limited thereto.

Example 1: Preparation of Coordination Polymer [Zn(Tkpvb)(Fb)$_2$]$_{n1}$

A mixture of zinc nitrate hexahydrate (297 mg, 0.1 mmol), 1,2,4,5-tetrakis((E)-2-(4-pyridyl)vinyl)benzene (490 mg, 0.1 mmol) and p-fluorobenzoic acid (280 mg, 0.1 mmol) was added to a 25 mL of thick-walled pressure flask. Then 10 mL of a mixed solution of N,N'-dimethyl formamide and deionized water at a volume ratio of 2:3 was added, and the system was adjusted to about pH 5 with 0.1 M hydrochloric acid. The flask was sealed, ultrasonically dispersed for 10 min, heated for 8 h in an oven at a temperature programmed to 120° C., and then naturally cooled to room temperature, to obtain a bright yellow lump crystal [Zn (tkpvb) (Fb)$_2$]$_{n1}$ (CP1). The crystal was washed with ethanol, collected, and dried in an oven at 60° C. Yield: 472.8 mg (65%, calculated based on 1,2,4,5-tetrakis((E)-2-(4-pyridyl)vinyl)benzene).

Elemental analysis (%): $C_{48}H_{34}F_2N_4O_4Zn$; Calculated: C 69.11, H 4.11, N 6.72; Found: C 69.88, H 4.20, N 6.75.

Infrared spectrum (potassium bromide disc method): 3045 (w), 1610 (w), 1504 (w), 1409 (w), 1362 (s), 1219 (m), 1151 (s), 1025 (w), 857 (m), 780 (m), 629 (m), 620 (s), 536 (s) cm$^{-1}$.

Figure 3:
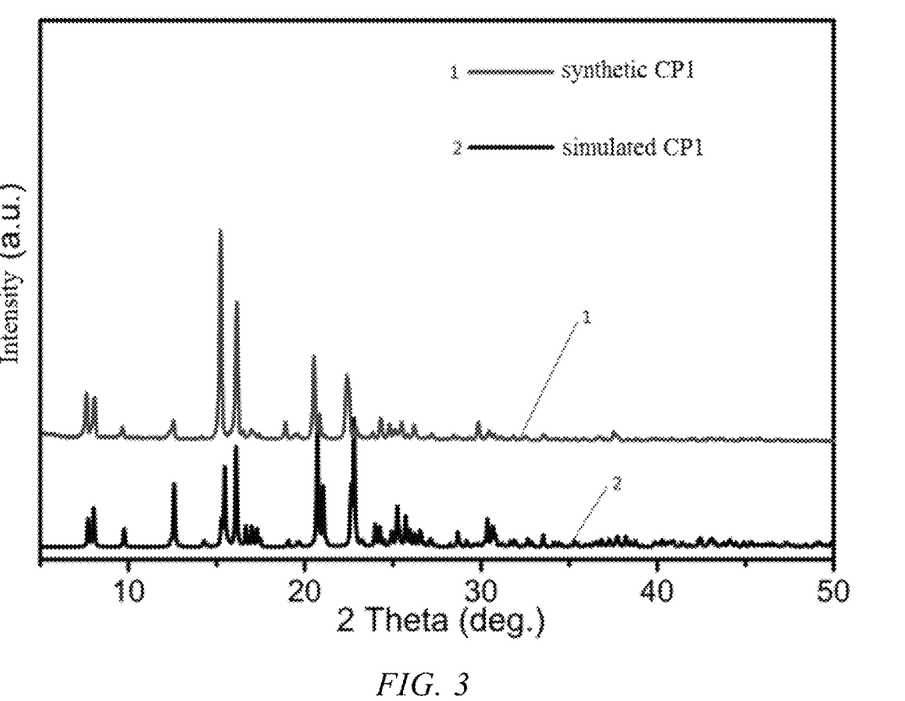
FIG. 3 shows a X-ray powder diffraction pattern of Compound [Zn(tkpvb)(Fb)$_2$]$_{n1}$ in Example 1.
Figure 4:
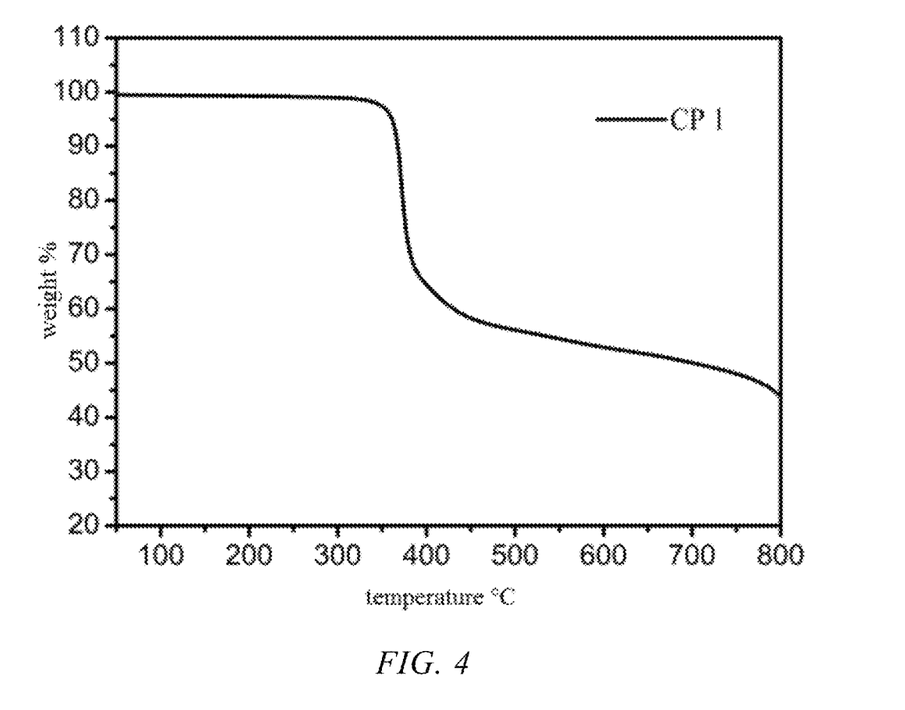
FIG. 4 shows a thermogravimetric analysis profile of Compound [Zn(tkpvb)(Fb)$_2$]$_{n1}$ in Example 1.
Figure 5:
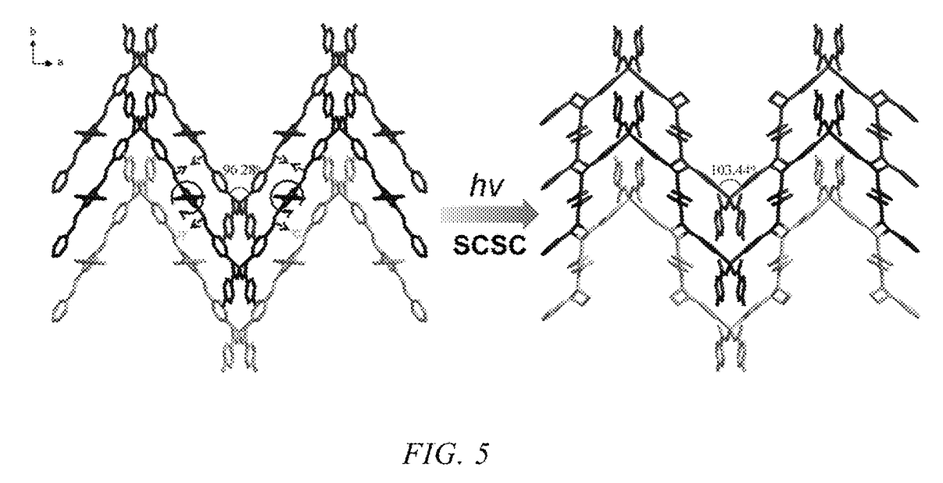
FIG. 5 is a schematic diagram showing the chemical conversion of Compound [Zn(tkpvb)(Fb)$_2$]$_{n1}$ into [Zn(poly-bpbpvpcb)(Fb)$_2$]$_{n2}$ in Example 2.
Figure 6:
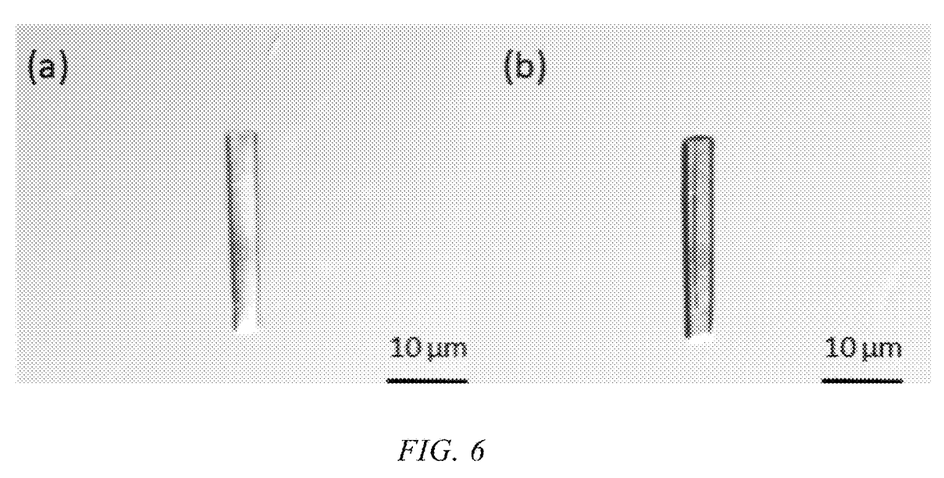
FIG. 6 shows the single crystal morphology of [Zn(tkpvb)(Fb)$_2$]$_{n1}$(a) and [Zn(poly-bpbpvpcb)(Fb)$_2$]$_{n1}$(b) in Example 2.
Figure 7:
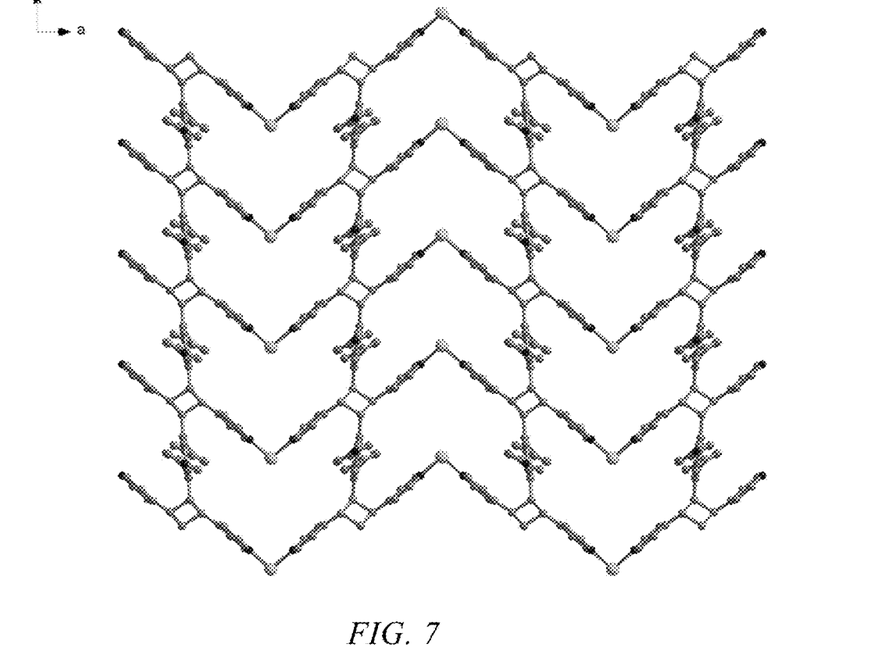
FIG. 7 shows the two-dimensional structure of Compound [Zn(poly-bpbpvpcb)(Fb)$_2$]n$_2$(CP2) in Example 2.
Figure 8:
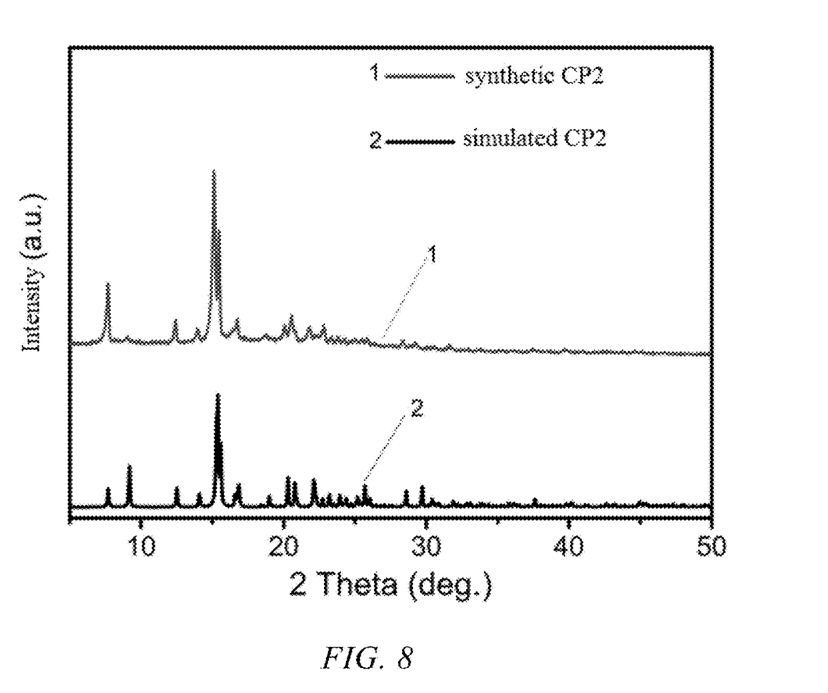
FIG. 8 shows a X-ray powder diffraction pattern of Compound [Zn(poly-bpbpvpcb)(Fb)$_2$]n$_2$(CP2) in Example 2.
Figure 9:
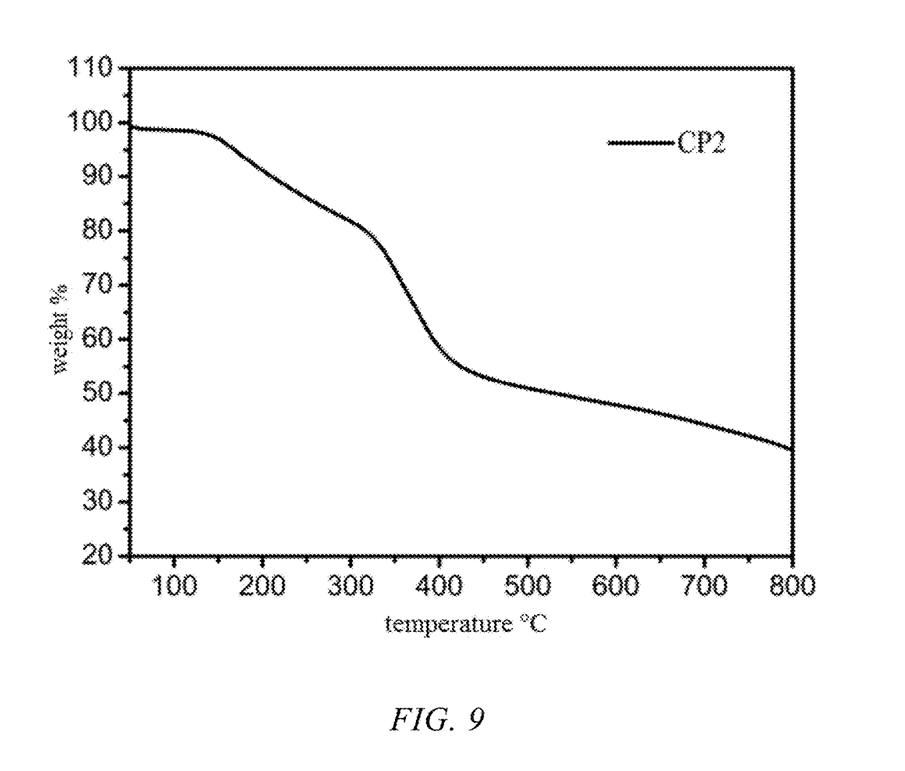
FIG. 9 shows a thermogravimetric analysis profile of Compound [Zn (poly-bpbpvpcb)(Fb)$_2$]$_{n2}$(CP2) in Example 2.
Figure 10:
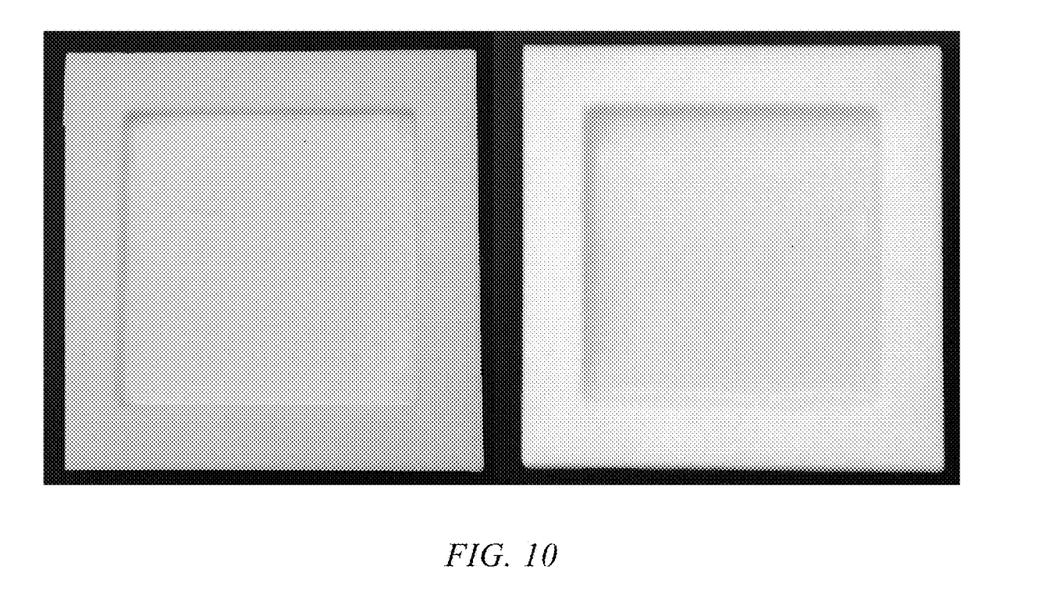
FIG. 10 shows a Teflon mold (left) and a mold loaded with a composite film (right) in Example 3.

The structure of the compound was characterized by single crystal X-ray diffraction, powder X-ray diffraction and thermogravimetric analysis. The crystallographic parameters are listed in Table 1. The X-ray powder diffraction pattern and thermogravimetric analysis profile are shown in FIGS. 3 and 4.

TABLE 1

Crystallographic parameters of the coordination polymer of Example 1

| Compounds | CP1 |
|---|---|
| Molecular formula | $C_{48}H_{34}F_2N_4O_4Zn$ |
| Molecular weight | 834.16 |
| Temperature | 119.98 |
| Crystal system | Monoclinic |
| Space group | C2/c |
| a/Å | 28.577(3) |
| b/Å | 7.4084(6) |
| c/Å | 22.612(3) |
| α/° | 90 |
| β/° | 126.771(2) |
| γ/° | 90 |
| V/Å$^3$ | 3834.8(7) |
| Dc/g cm$^{-3}$ | 1.445 |
| Z | 4 |
| μ (Mo-Kα)/mm$^{-1}$ | 0.704 |
| Total number of diffraction points | 19493 |
| Number of independent diffraction points | 4392 |
| F(000) | 1720 |
| R$_1{}^a$ | 0.0440 |
| wR$_2{}^b$ | 0.1042 |
| GOF$^c$ | 1.047 |

Figure 1:
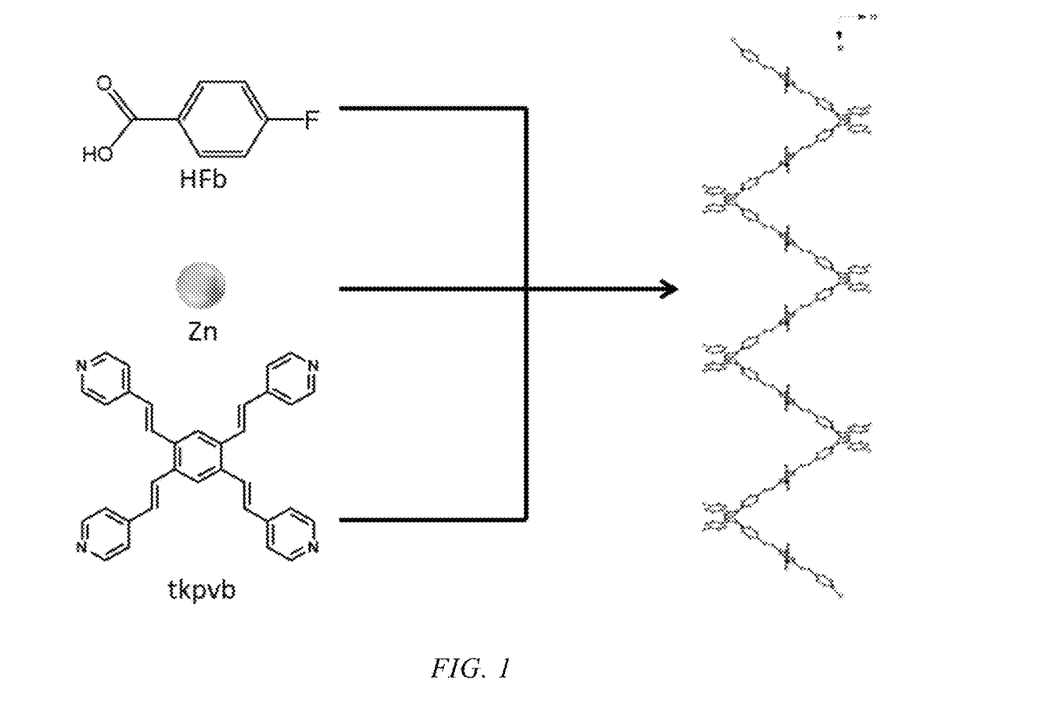
FIG. 1 is a schematic diagram showing the synthesis of Compound [Zn(tkpvb)(Fb)$_2$]$_{n1}$ in Example 1.
Figure 2:
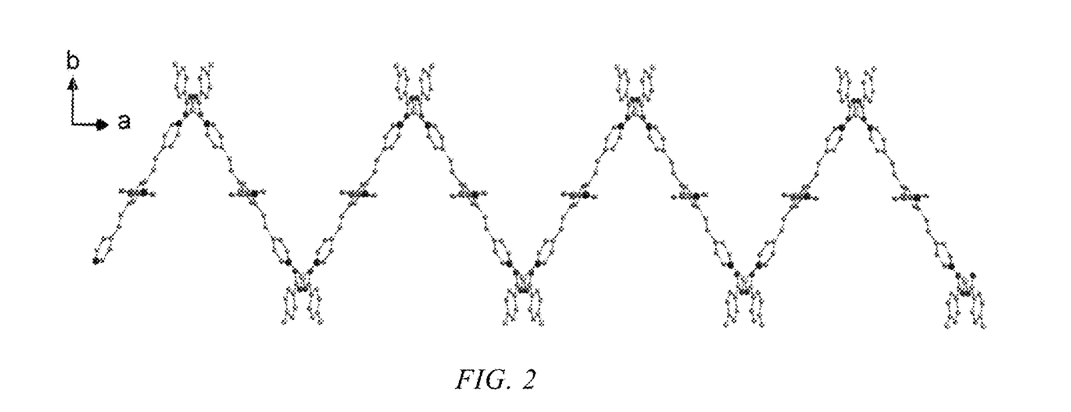
FIG. 2 shows the one-dimensional stacking of Compound [Zn(tkpvb)(Fb)$_2$]$_{n1}$ in Example 1.

The compound is monoclinic, and the space group is C2/c. FIG. 1 schematically shows the synthesis and the spatial structure of Compound CP1. As can be seen, the central metal ion in the above coordination polymer containing an alkene ligand is Zn2+, which is coordinated with O in two p-fluorobenzoic acid molecules, and N in two tkpvb ligand molecules. The metal ions are bridged by the tkpvb ligand, and extend to form a one-dimensional chain-like structure as shown in FIG. 2.

Example 2: Preparation of Coordination Polymer [Zn (Poly-Bpbpvpcb) (Fb)$_2$]$_{n2}$(CP2)

At room temperature, a small amount of CP1 crystal was placed on a clean glass slide, and irradiated with an LED light having a wavelength of 500 nm for 30 min while a distance of 2 cm was maintained between the light source and the crystal to obtain a [2+2] cycloaddition product [Zn (poly-bpbpvpcb) (Fb)$_2$]$_{n2}$(CP2) with a conversion rate of 100%.

Elemental analysis (%): $C_{48}H_{34}F_2N_4O_4Zn$; Calculated: C 69.11, H 4.11, N 6.72; Found: C 69.10, H 4.15, N 6.73.

Infrared spectrum (potassium bromide disc method): 2934 (w), 1735 (w), 1431 (w), 1375 (w), 1245 (w), 1143 (w), 1095 (s), 919 (w), 881 (m), 821 (s), 745 (s), 688 (m), 546 (s) cm$^{-1}$ The product was tested by single crystal X-ray diffraction. The crystallographic parameters are listed in Table 2. The single-crystal morphology, two-dimensional structure, X-ray diffraction pattern and thermogravimetric analysis profile of the powder are shown in FIGS. 6-9.

TABLE 2

Crystallographic parameters of the coordination polymer of Example 2

| Compounds | CP2 |
|---|---|
| Molecular formula | $C_{48}H_{34}F_2N_4O_4Zn$ |
| Molecular weight | 834.16 |
| Temperature | 119.99 |
| Crystal system | Monoclinic |
| Space group | C2/c |
| a/Å | 28.252(6) |
| b/Å | 7.392(2) |
| c/Å | 23.651(5) |
| α/° | 90.00(3) |
| β/° | 125.82(3) |
| γ/° | 90.00(3) |
| V/Å$^3$ | 4005(2) |
| Dc/g cm$^{-3}$ | 4 |
| Z | 1.383 |
| μ (Mo-Kα)/mm$^{-1}$ | 0.674 |
| Total number of diffraction points | 21661 |
| Number of independent diffraction points | 3526 |
| F(000) | 1720 |
| R$_1{}^a$ | 0.1195 |
| wR$_2{}^b$ | 0.2944 |
| GOF$^c$ | 1.152 |

Example 3: Preparation of Composite Film 0-PVA

CP1 was ground into a uniform powder in a mortar (about 30 minutes), and then 200 mg of the powder was dispersed in 4 mL of ethanol, ultrasonicated for 5 h, and dried at 60° C. 2.25 g of 10% PVA aqueous solution was mixed with the powder and stirred for 12 h to obtain a uniform viscous liquid. Subsequently, the mixed solution was added dropwise to a polytetrafluoroethylene mold having a clean surface dried with nitrogen, and allowed to stand overnight at 80° C. in an oven to remove the remaining solvent. After the solvent was completely evaporated, a free-standing composite film 0-PVA was obtained by peeling from the mold.

Figure 11:
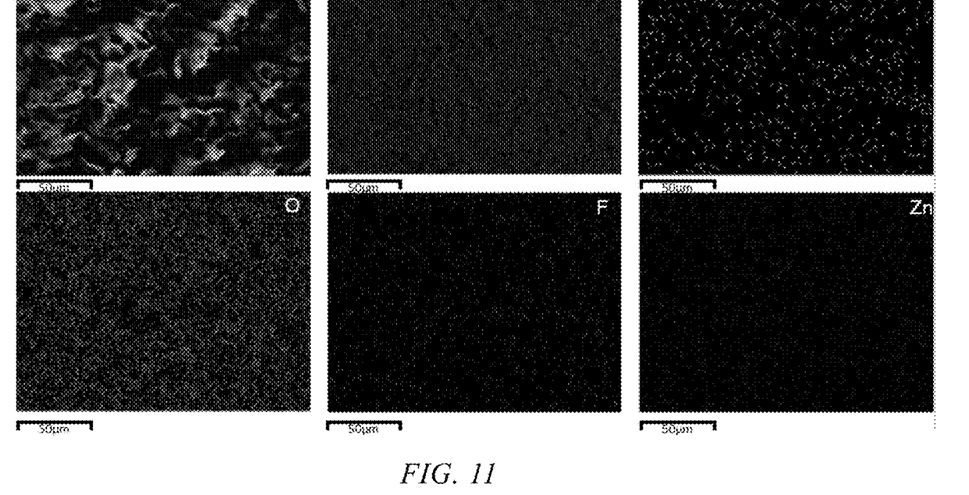
FIG. 11 shows an SEM image (upper left) and an EDS mapping images (others) of the composite film in Example 3.
Figure 12:
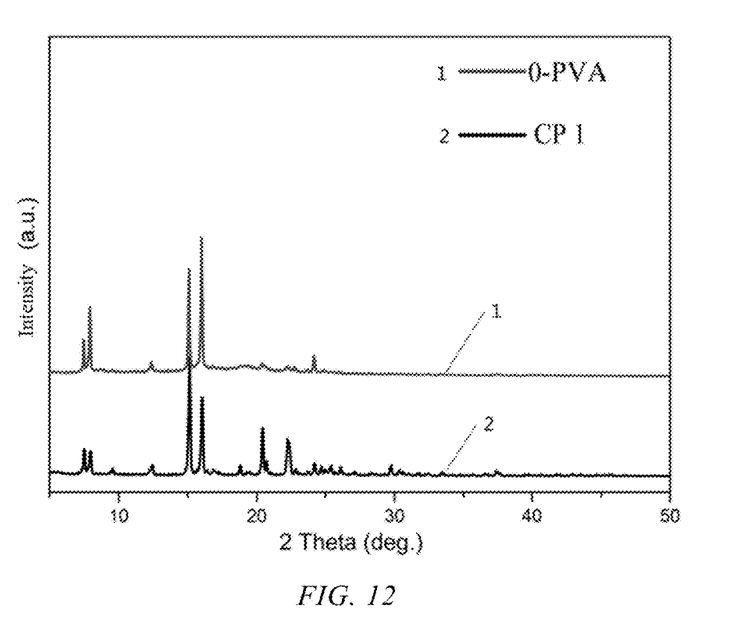
FIG. 12 shows an X-ray powder diffraction pattern of the composite film 0-PVA in Example 3.

The composite film was analyzed by scanning electron microscopy (SEM), EDS mapping, and X-ray powder diffraction. The SEM image, EDS mapping image, and X-ray powder diffraction pattern are shown in FIGS. 11, and 12.

Example 4: Preparation and Mechanical Behavior Study of Photoactuator 1

Figure 13:
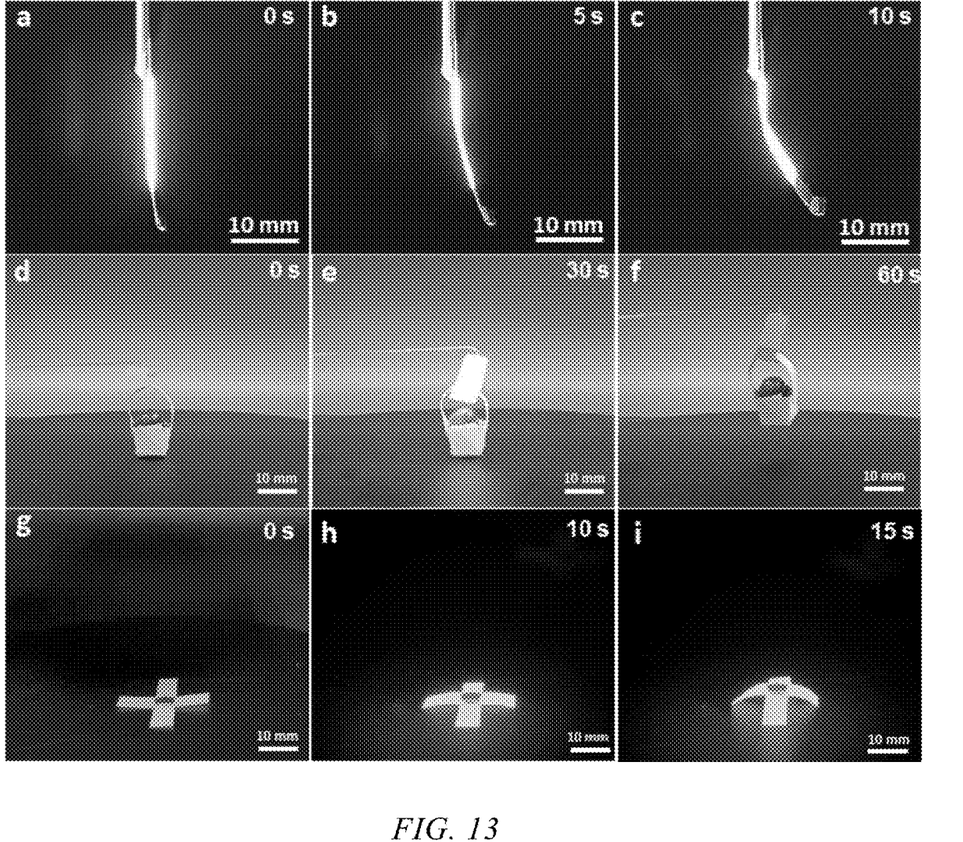
FIG. 13 schematically shows the photomechanical behavior of the photoactuator 1 in Examples 4 (a-c), 5 (d-f) and 6 (g-h).

0-PVA was cut into a strip of 0.5 cm×2 cm, to prepare a photoactuator 1 (1-PVA). One end of the photoactuator 1 was fixed with a clip, and the other end was tied with a heavy object. The film was irradiated with an LED light having a wavelength of 365 nm (at a distance of about 2 cm) and the process was recorded with a high-speed camera (1200 frames/s). When exposed to irradiation with light of 365 nm, the photoactuator 1 undergoes backlight bending quickly, with a bending angle up to 45°, to lift the heavy object (see FIG. 13).

Example 5: Preparation and Mechanical Behavior Study of Photoactuator 2

0-PVA was cut into a strip of 0.5 cm×3 cm, and the strip-shaped composite film was fold at an edge (0.5 cm×0.5 cm) by an angle of 900 to form a "knuckle" of a "finger" for grabbing a heavy object. The film material is a photoactuator 2 (2-PVA). 2-PVA was laid flatly, and illuminated with light having a wavelength of 365 nm at a distance of 5 cm from the above, and the process was recorded with a high-speed camera (1200 frames/s). The "finger" began to bend, to grab the heavy object underneath (see FIG. 13).

Example 6: Mechanical Behavior Study of Photoactuator 3-PVA

0-PVA was cut into a strip of 0.5 cm×2 cm. Two cut composite films were crisscrossed and fixed together, at an angle of 90°. The film material is a photoactuator 3 (3-PVA). 3-PVA was laid flatly on a flat surface, and a heavy object was placed at a central position. 4-PVA was irradiated with an LED light having a wavelength of 365 nm at a distance of 5 cm from the above (at a distance of about 5 cm) and the process was recorded with a high-speed camera (1200 frames/sec). As shown in FIG. X, when exposed to irradiation with light of 365 nm, four sides of 3-PVA are bent, so the center was arched, similar to the situation where a jack props a heavy object in the center. In this way, 3-PVA can props an object that is 20 times higher than its own weight (see FIG. 13).

The present invention discloses a method for preparing a coordination polymer and a method for preparing three photoactuators using the coordination polymer as a raw material. Specifically, in the present invention, a photosensitive coordination polymer $[Zn(tkpvb)(Fb)_2]_{n1}$ (CP1) is hydrothermally synthesized at a low temperature (120° C.), which undergoes an [2+2] cycloaddition reaction under irradiation with light having a wavelength of 365 nm. In this process, a photoinduced stress is generated. The photoinduced stress is amplified by preparing a composite film, and then a series of photoactuators 1-PVA, 2-PVA, and 3-PVA are prepared with CP1 as a raw material. The preparation method of the present invention is simple, and has mild reaction conditions, and fast light conversion rate. By introducing non-contact and non-damage light as a driving source, the mechanical behavior of the photoactuator is accurately controlled. The photoactuator is rapidly responsive, and can complete a variety of mechanical behaviors. The control process is simple and easy to operate, and requires no chemical reagents. conforming the concept of green chemistry.

Obviously, the above-described embodiments are merely examples provided for clarity of description, and are not intended to limit the implementations of the present invention. Other variations or changes can be made by those skilled in the art based on the above description. The embodiments are not exhaustive herein. Obvious variations or changes derived therefrom also fall within the protection scope of the present invention.

What is claimed is:

1. A light-stimuli responsive coordination polymer, wherein the coordination polymer is a bright yellow bulk crystal and has a chemical formula of $[Zn(tkpvb)(Fb)_2]_{n1}$, crystallographic parameters of:
    (1) crystal system: monoclinic system;
    (2) space group: C2/c;
    (3) a=28.577(3) Å, b=7.4084(6) Å, c=22.612(3) Å, β=126.771(2)°, and V=3834.8(7) Å$^3$;
    (4) Z=4; and
    (5) F(000)=1720, $R_1$=0.0440, $wR_2$=0.1042, and GOF=1.047,
    wherein Fb represents p-fluorobenzoate, tkpvb represents 1,2,4,5-tetrakis((E)-2-(4-pyridyl)vinyl)benzene, and n1=3000-60000.

2. A method for preparing a light-stimuli responsive coordination polymer according to claim 1, comprising steps of:
    dissolving zinc nitrate hexahydrate, p-fluorobenzoic acid or a water-soluble salt thereof, and 1,2,4,5-tetrakis((E)-2-(4-pyridyl)vinyl)benzene in a mixed solvent of N,N-dimethylformamide and water, adjusting the pH to 5-6, and reacting to obtain the light-stimuli responsive coordination polymer.

3. The preparation method according to claim 2, wherein the molar ratio of zinc nitrate hexahydrate, p-fluorobenzoic acid or a water-soluble salt thereof and 1,2,4,5-tetrakis((E)-2-(4-pyridyl)vinyl)benzene is 1-2.5:1-2.5:1-2.5.

4. The preparation method according to claim 2, wherein the reaction temperature is 120 to 125° C., and the time is 5-12 h.

5. A composite film, comprising a light-stimuli responsive coordination polymer according to claim 1.

6. A method for preparing a composite film according to claim 5, comprising steps of:
    S1: grinding the light-stimuli responsive coordination polymer, dispersing in a solvent, and drying;
    S2: adding a substrate, and stirring to obtain a uniform viscous liquid;
    S3: adding the uniform viscous liquid into a mold, drying, and peeling to obtain the composite film.

7. The method for preparing a composite film according to claim 6, wherein the substrate is selected from the group consisting of PVA, chitosan, polyvinylidene difluoride, polypropylene and any combination thereof.

8. A photoactuator, prepared with a composite film according to claim 5.

* * * * *